(12) United States Patent
Ingram et al.

(10) Patent No.: US 8,255,099 B2
(45) Date of Patent: Aug. 28, 2012

(54) FLIGHT MANAGEMENT SYSTEM VECTOR FUNCTIONS

(75) Inventors: Michael J. Ingram, Melbourne, FL (US); Steven Lindsley, Melbourne, FL (US); Michael Keirnan, Melbourne, FL (US)

(73) Assignee: Avidyne Corporation, Lincoln, MA (US)

( * ) Notice: Subject to any disclaimer, the term of this patent is extended or adjusted under 35 U.S.C. 154(b) by 0 days.

(21) Appl. No.: 12/775,224

(22) Filed: May 6, 2010

(65) Prior Publication Data

US 2010/0250033 A1    Sep. 30, 2010

Related U.S. Application Data

(62) Division of application No. 11/731,813, filed on Mar. 30, 2007, now Pat. No. 7,715,954.

(60) Provisional application No. 60/788,377, filed on Mar. 30, 2006.

(51) Int. Cl.
  *G05D 1/00* (2006.01)
(52) U.S. Cl. ............................ 701/11; 701/3; 701/411
(58) Field of Classification Search ............ 701/11, 701/207, 213, 3, 4, 16, 411
  See application file for complete search history.

(56) References Cited

U.S. PATENT DOCUMENTS

| | | | | |
|---|---|---|---|---|
| 5,398,186 A * | 3/1995 | Nakhla | ............................ | 701/16 |
| 5,523,949 A * | 6/1996 | Agate et al. | ...................... | 701/17 |
| 5,568,390 A * | 10/1996 | Hirota et al. | ................... | 701/201 |
| 5,797,106 A * | 8/1998 | Murray et al. | ................... | 701/11 |
| 5,916,297 A * | 6/1999 | Griffin et al. | .................. | 701/120 |
| 5,978,715 A * | 11/1999 | Briffe et al. | ...................... | 701/11 |
| 6,038,497 A * | 3/2000 | Nelson, Jr. | ......................... | 701/3 |
| 6,038,498 A * | 3/2000 | Briffe et al. | ........................ | 701/3 |
| 6,092,007 A * | 7/2000 | Cotton et al. | ...................... | 701/4 |
| 6,112,141 A * | 8/2000 | Briffe et al. | ...................... | 701/14 |
| 6,163,744 A * | 12/2000 | Onken et al. | ....................... | 701/3 |
| 6,282,466 B1 * | 8/2001 | Nolte et al. | ...................... | 701/11 |
| 6,308,116 B1 * | 10/2001 | Ricks et al. | ...................... | 701/11 |
| 6,438,469 B1 * | 8/2002 | Dwyer et al. | .................... | 701/16 |
| 6,542,796 B1 * | 4/2003 | Gibbs et al. | ........................ | 701/3 |
| 6,711,479 B1 * | 3/2004 | Staggs | .............................. | 701/16 |
| 7,024,287 B2 * | 4/2006 | Peckham et al. | ................... | 701/3 |
| 7,054,739 B2 * | 5/2006 | Taylor | ............................ | 701/200 |

(Continued)

OTHER PUBLICATIONS

Goyer, R., Entegra Release 9: A Game Changer From Avidyne, Sep. 2009 [retrieved on Oct. 27, 2009]. Retrieved from the Internet <URL: http://www.flyingmag.com/avionics.739/entegra-release-9-a-game-changer-from-avidyne.html>.

*Primary Examiner* — Helal A Algahaim
(74) *Attorney, Agent, or Firm* — Hamilton, Brook, Smith & Reynolds, P.C.

(57) ABSTRACT

Disclosed is a system and method for diverting from a flight plan without adjusting an autopilot by treating a heading change as the new leg of a flight plan. The present invention allows the pilot of an aircraft to enter a heading to follow into a flight management system, which treats the heading as the current leg of a flight plan otherwise being followed by the flight management system. The present invention graphically displays the heading leg as the predicted track so that the pilot is able to see the airplane's expected path. Such a change allows the autopilot to continue following commands from the flight management system rather than being changed to a mode in which the autopilot follows heading commands directly from the pilot.

11 Claims, 10 Drawing Sheets

U.S. PATENT DOCUMENTS

| | | | |
|---|---|---|---|
| 7,302,316 B2* | 11/2007 | Beard et al. | 701/11 |
| 7,403,843 B2* | 7/2008 | Gremmert | 701/3 |
| 7,437,225 B1* | 10/2008 | Rathinam | 701/14 |
| 2002/0022909 A1* | 2/2002 | Karem | 701/3 |
| 2003/0004619 A1* | 1/2003 | Carriker et al. | 701/3 |
| 2004/0044446 A1* | 3/2004 | Staggs | 701/16 |
| 2004/0122567 A1* | 6/2004 | Gaier | 701/4 |
| 2004/0220722 A1* | 11/2004 | Taylor | 701/200 |
| 2004/0239550 A1* | 12/2004 | Daly, Jr. | 342/26 B |
| 2005/0165516 A1* | 7/2005 | Haissig et al. | 701/4 |
| 2005/0187677 A1* | 8/2005 | Walker | 701/16 |
| 2005/0203676 A1* | 9/2005 | Sandell et al. | 701/3 |
| 2006/0025899 A1* | 2/2006 | Peckham et al. | 701/3 |
| 2007/0043482 A1* | 2/2007 | Aimar | 701/4 |

* cited by examiner

FLIGHT MANAGEMENT SYSTEM VECTOR FUNCTIONS

RELATED APPLICATIONS

This application is a divisional of U.S. application Ser. No. 11/731,813, filed Mar. 30, 2007 now U.S. Pat. No. 7,715,954, which claims the benefit of U.S. Provisional application Ser. No. 60/788,377, filed on Mar. 30, 2006, the entire teachings of which are incorporated by reference.

BACKGROUND

Some flight management systems (FMS) have legs in a preprogrammed flight plan where an airplane is not being guided to a path, but instead the pilot is changing heading. There are at least four instances where this is possible: 1) approach vectors to final (VTF) leg; 2) flight plan discontinuity (discon); 3) missed approach; and 4) and an en-route radar vectors from air traffic control (ATC). Each instance is slightly different, but the pilot operation is essentially equivalent.

In the current general aviation (GA) aircraft, when changing from flight plan guidance to heading commands, a pilot changes modes on an S-TEC 55X autopilot or equivalent device from roll steering mode to a heading mode. Roll steering mode is the FMS commanding the autopilot to move the airplane to a specific bank and where the autopilot follows courses of the flight plan, whereas the autopilot heading mode is commanding the servos to steer the aircraft in order to follow the pilot commanded heading.

SUMMARY OF THE INVENTION

The present invention relates to a flight management system that, when prompted, treats a course heading input by the pilot as the current leg of an active flight plan, allowing the autopilot to remain in roll steering mode. This leg is presented graphically to the pilot as a track-made-good path based on the pilot-entered magnetic heading corrected for ground speed, wind speed and wind direction.

DETAILED DESCRIPTION OF THE INVENTION

A description of preferred embodiments of the invention follows.

There are four typical instances in which the pilot of an aircraft may divert from a preprogrammed flight plan to follow a specific course heading. First, as the pilot approaches an airport for landing, air traffic control (ATC) may provide vectors for the pilot to follow. Second, there may be a disconnect in the flight plan in which the pilot must provide a course to the flight management system (FMS), typically through a flight management computer (FMC), which is part of the FMS. Third, the pilot will specify a course heading when executing a missed approach. Fourth, while en-route, ATC may divert the pilot from his planned course.

As discussed above, the prior art methods of handling vectors resulted in high workloads for the pilot. Under the prior art method, the pilot would have to suspend the flight plan in the FMS and change the autopilot from roll steering mode to heading mode. The pilot would then have to set the course heading to be followed.

The present invention allows the pilot to leave the autopilot in roll steering mode by causing the FMS to treat a heading indication input by the pilot as the active leg of the flight plan. In one embodiment of the present invention, the pilot presses a "vectors" button (or effectively similar user command) on the FMS to enter VECTORS mode and cause the FMS to treat a heading input by the pilot as the active leg of the flight plan.

Figure 1:
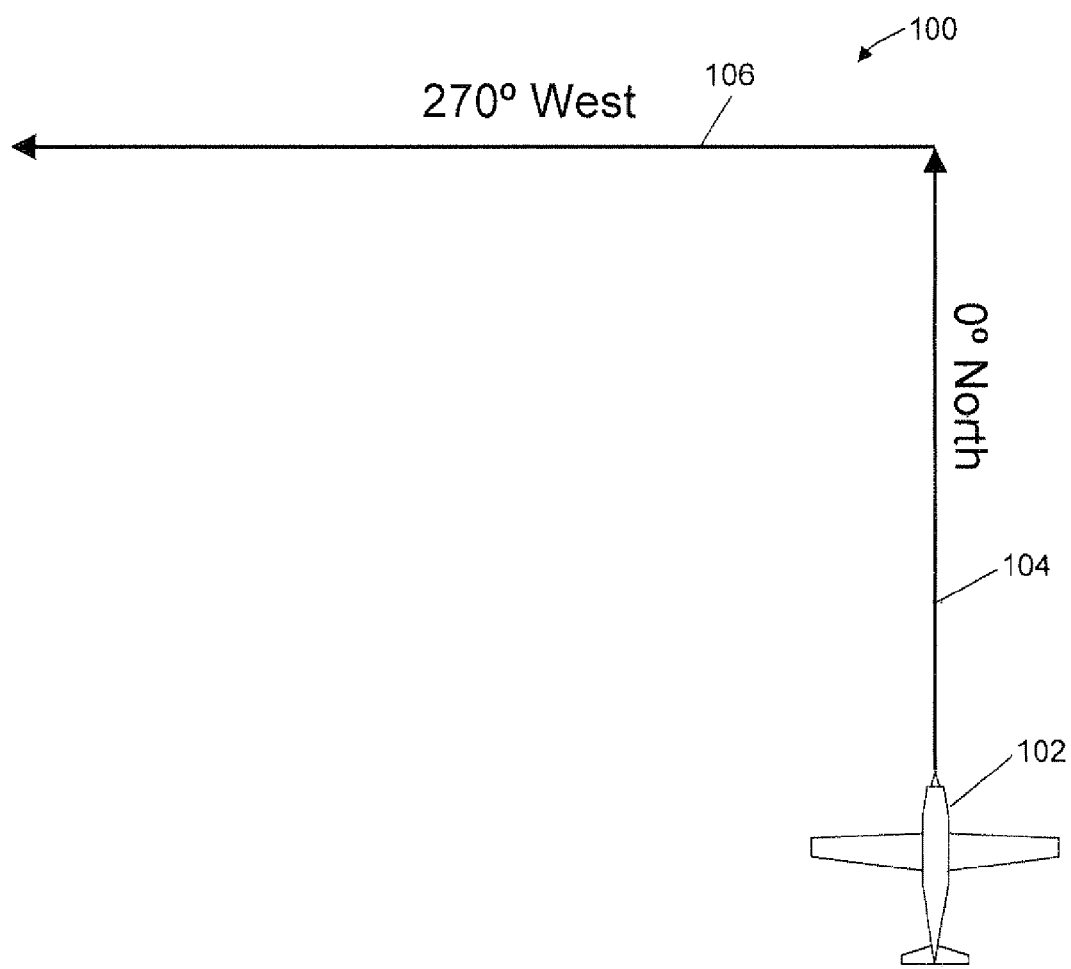
FIG. 1 is an illustration of a portion of an electronic map display according to one embodiment of the present invention.

FIG. 1 illustrates a possible map display 100 in which the aircraft 102 is shown to be traveling on a first leg 104 of a preprogrammed flight plan (the active leg) and a second leg 106 coming up (succeeding). In roll steering mode, the autopilot will fly along the first leg 104 until reaching the second leg 106. Then, the autopilot will automatically steer the aircraft from the first leg 104 onto the second leg 106.

Figure 2:
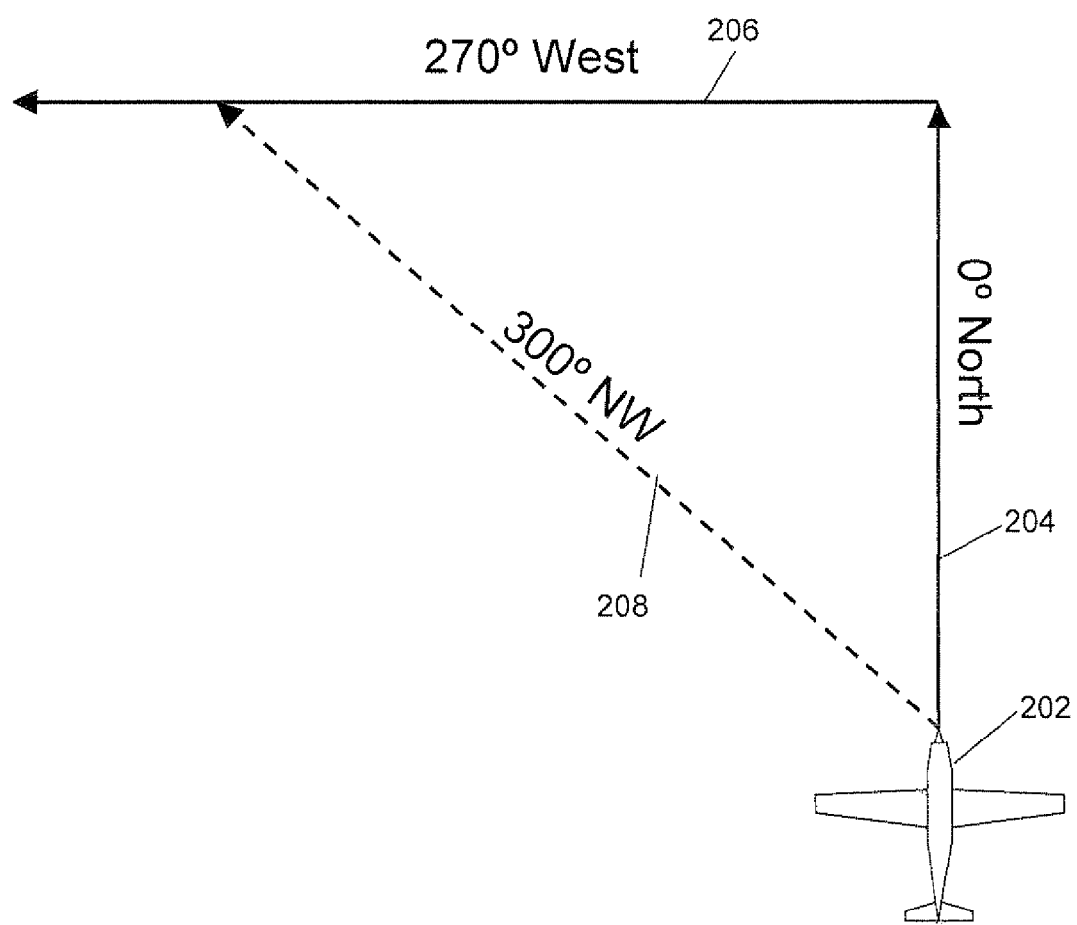
FIG. 2 is a schematic illustration of an aircraft with both a flight plan and a vectors diversion from the inflight plan.

FIG. 2 illustrates a possible vector, for example, provided by ATC as an example. FIG. 2 shows the aircraft 202 flying along a preprogrammed first leg 204 of its flight plan en route to a second leg 206 when it receives instructions from ATC to turn to a new heading 208. Under an embodiment of the present invention, the pilot presses a "Vectors" or "VECT" (or –V→) button on a Flight Management Computer (FMC) to enter vectors mode, which causes the FMS to treat a heading input by the pilot as the active leg of the flight plan.

Figure 3:
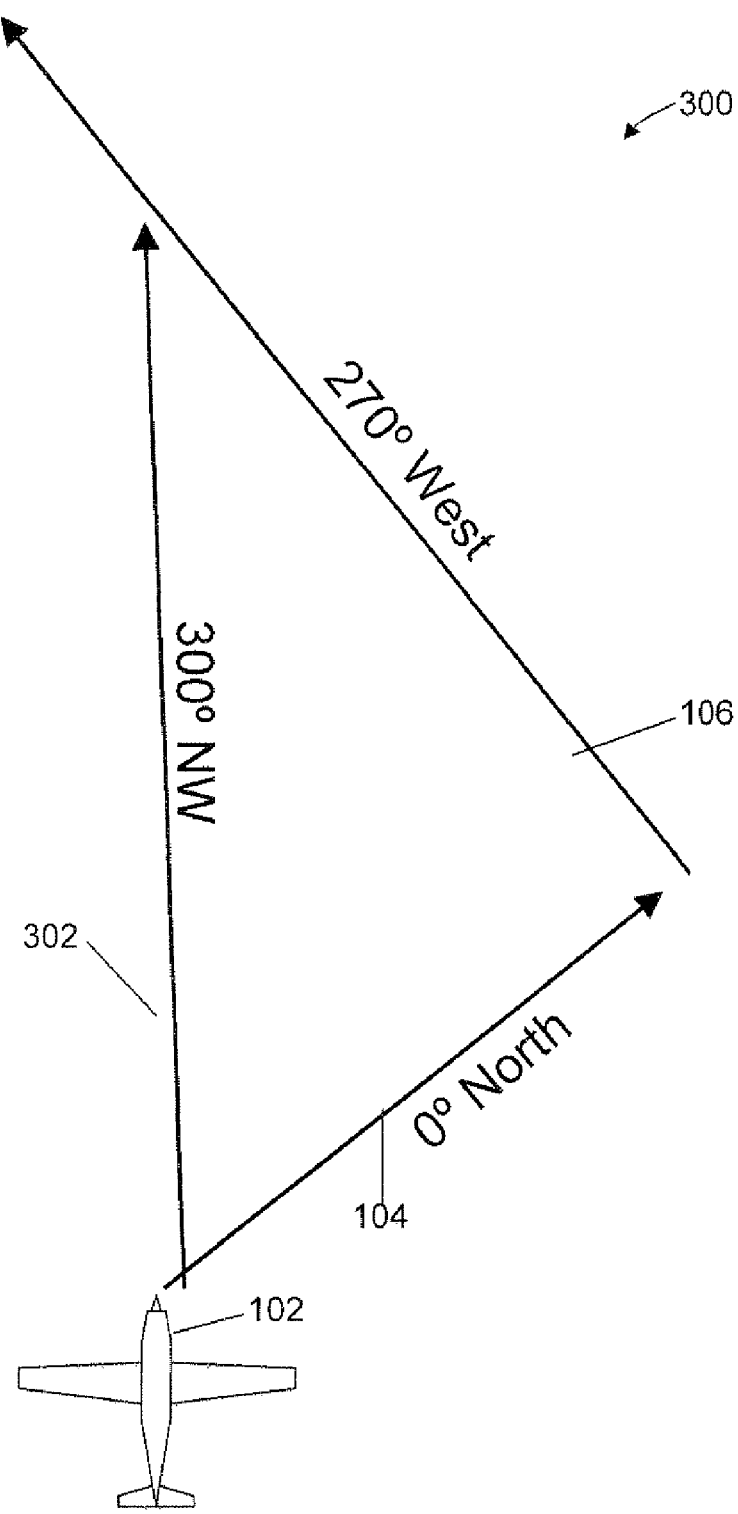
FIG. 3 is an illustration of a portion of an electronic map display according to embodiments of the present invention showing the aircraft on a vectors heading that intersects the flight plan.
Figure 4:
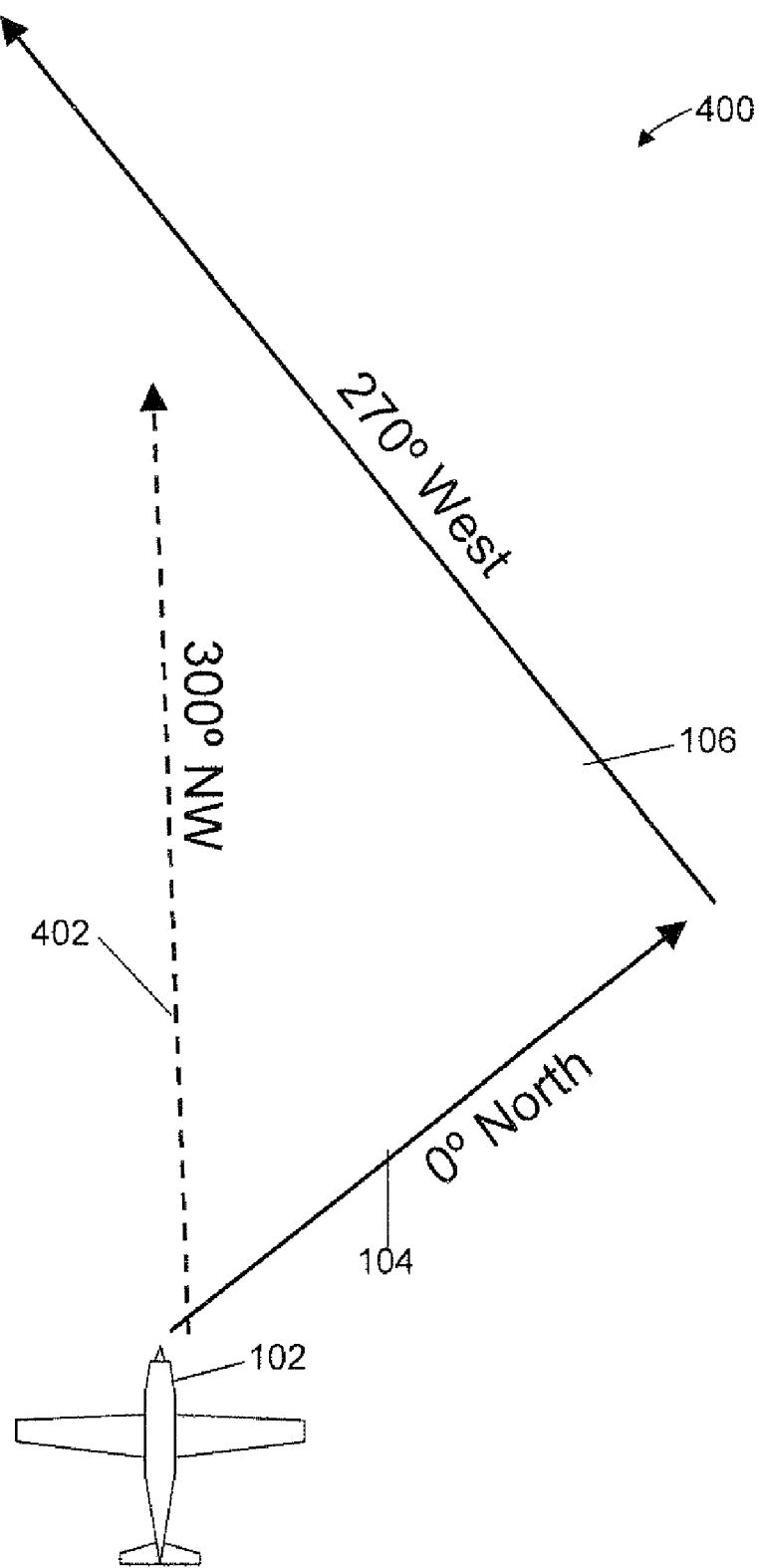
FIG. 4 is an illustration of a portion of an electronic map display according to embodiments of the present invention showing the aircraft on a vectors heading that does not intersect the flight plan.

FIG. 3 illustrates a possible embodiment of a map display 300 in which the pilot has input a course heading of 300° while in vectors mode. The map display 300 shows the original flight plan legs 104, 106 and also the course heading leg 302 input by the pilot. The heading leg is represented as a predicted ground track that may be different than the heading since the displayed leg is constructed based on the input magnetic heading, wind speed and wind direction. The map display 300 may show the course heading leg 302 differently depending on whether the course heading leg 302 intersects any leg of the preprogrammed flight plan. For example, the course heading leg 302 may be set to extend for a distance of twenty five nautical miles and the FMS may see if the course heading leg 302 intersects any original flight plan leg in that distance. FIG. 3 illustrates the course heading leg 302 as a solid line to indicate that the course heading leg 302 intersects a preprogrammed flight plan leg 106. By contrast, FIG. 4 illustrates the course heading leg 402 as a dashed line to indicate that the course heading leg 402 does not intersect an original flight plan leg 104, 106. FIGS. 3 and 4 illustrate one possible embodiment of the course heading leg 302, 402. It should be understood that other means may be used to distinguish between a course heading leg 302, 402 that intersects a leg of the original flight plan and a course heading leg 302, 402 that does not intersect a leg of the original flight plan.

Figure 5:
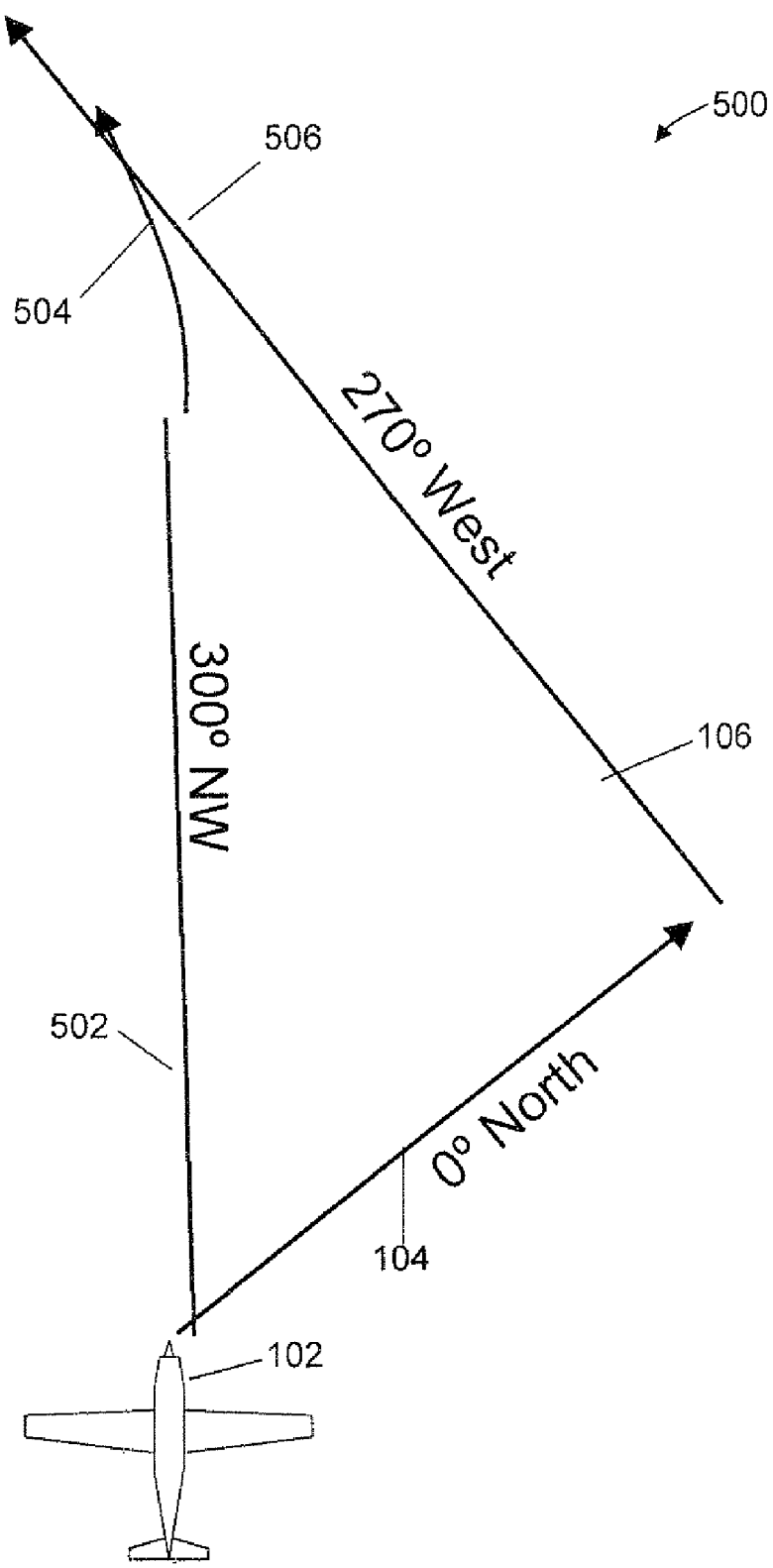
FIG. 5 is an illustration of a portion of an electronic map display according to embodiments of the present invention showing the aircraft on a vectors heading that is armed so that it intercepts the flight plan.

FIG. 5 illustrates another possible embodiment map display 500 according to the present invention in which the pilot informs the FMS whether to return to the preprogrammed flight plan at the point where the course heading leg 502 intersects the preprogrammed flight plan 104, 106. The map display 500 shows the preprogrammed flight plan 104, 106 from which the aircraft 102 has been diverted onto a course heading 502. In accordance with the invention, the pilot may press a VECT (or –V→) button on the FMC such that the autopilot treats the course heading leg 502 as the active leg of the flight plan and, therefore, the autopilot may remain in roll steering mode. As illustrated in FIG. 5, the course heading leg 502 would intersect the original flight plan leg 106 at a determinable point 506. The pilot can instruct the FMC to either intercept the preprogrammed flight plan leg 106 at the intersection or ignore the intersection and continue flying the course heading leg 502 beyond the intersection with the preprogrammed flight plan leg 106. The pilot instruction to intercept or not intercept may be entered via a button on the FMC. If the pilot instructs the FMC to intercept the preprogrammed flight plan leg 106, then the course heading leg 502 is modified to include a curved section 504 to smoothly transition from the course heading leg 502 to the original flight plan leg 106.

Figure 6:
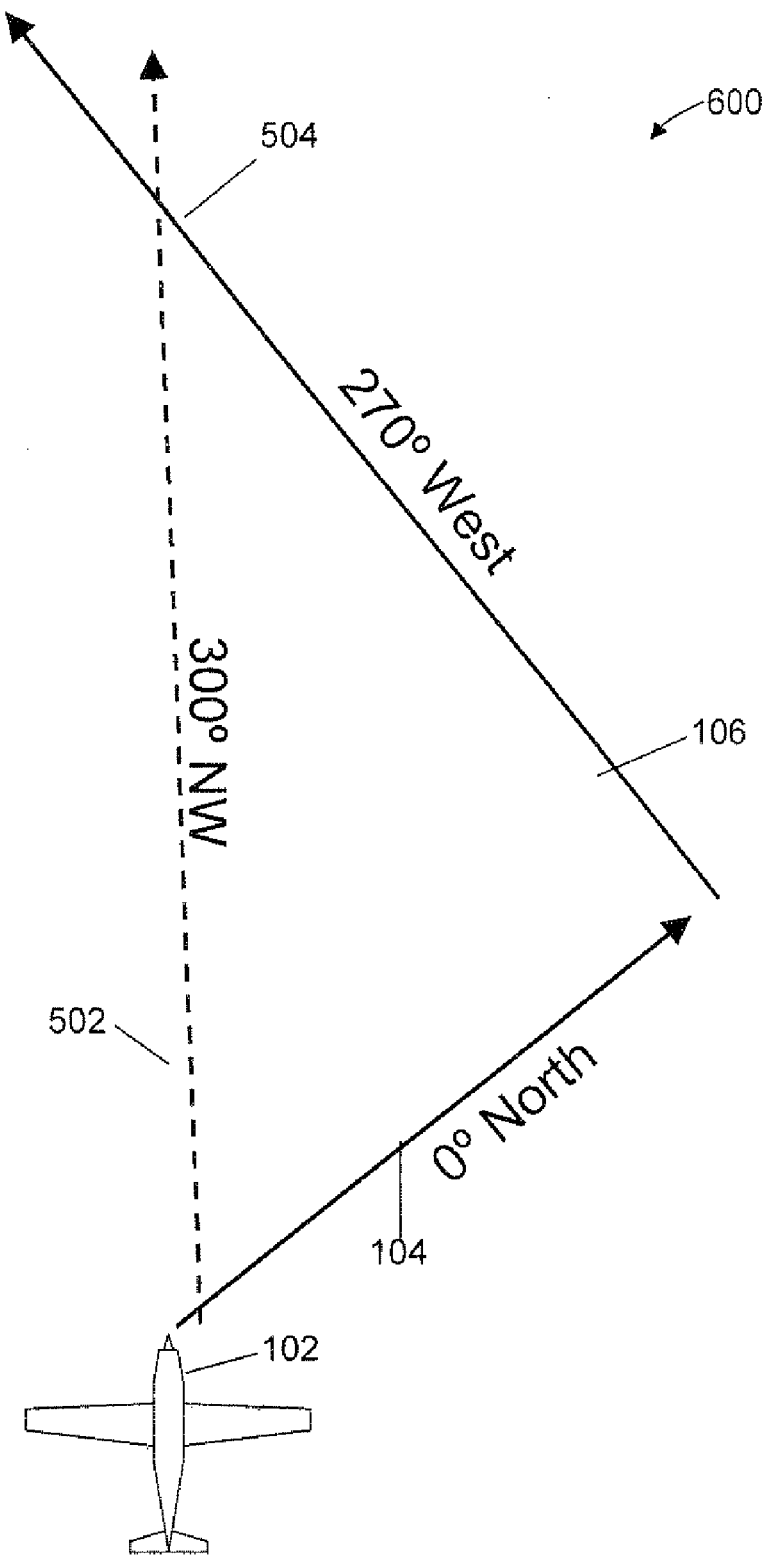
FIG. 6 is an illustration of a portion of an electronic map display according to embodiments of the present invention showing the aircraft on a vectors heading that intersects (crosses) the flight plan because the Vectors leg is not armed to intercept the flight plan.

FIG. 6 illustrates a possible map display 600 according to the present invention in which the pilot informs the FMC to ignore the intercept 504 of the course heading leg 502 and the preprogrammed flight plan leg 106. Here, the aircraft will continue to fly along the course heading leg 502 after passing the intercept point 504. In the example embodiment illustrated in FIGS. 5 and 6, the present setting of the FMC to either intercept or not intercept the original flight plan leg is distinguished by using a solid and dashed line respectively. One of ordinary skill in the art will understand that many other means may be used to distinguish an intercept course heading from a no-intercept course heading, such as different line colors or line thicknesses.

The intercept function may be a default setting, automatically curving the course heading leg whenever it crosses an original flight plan leg and requiring pilot action to disable the intercept. Alternatively, the intercept function may only be activated when the pilot takes action to instruct the FMS or FMC to intercept an original flight plan leg. The pilot is able to arm and disarm the intercept function at any time in some embodiments.

Figure 7A:
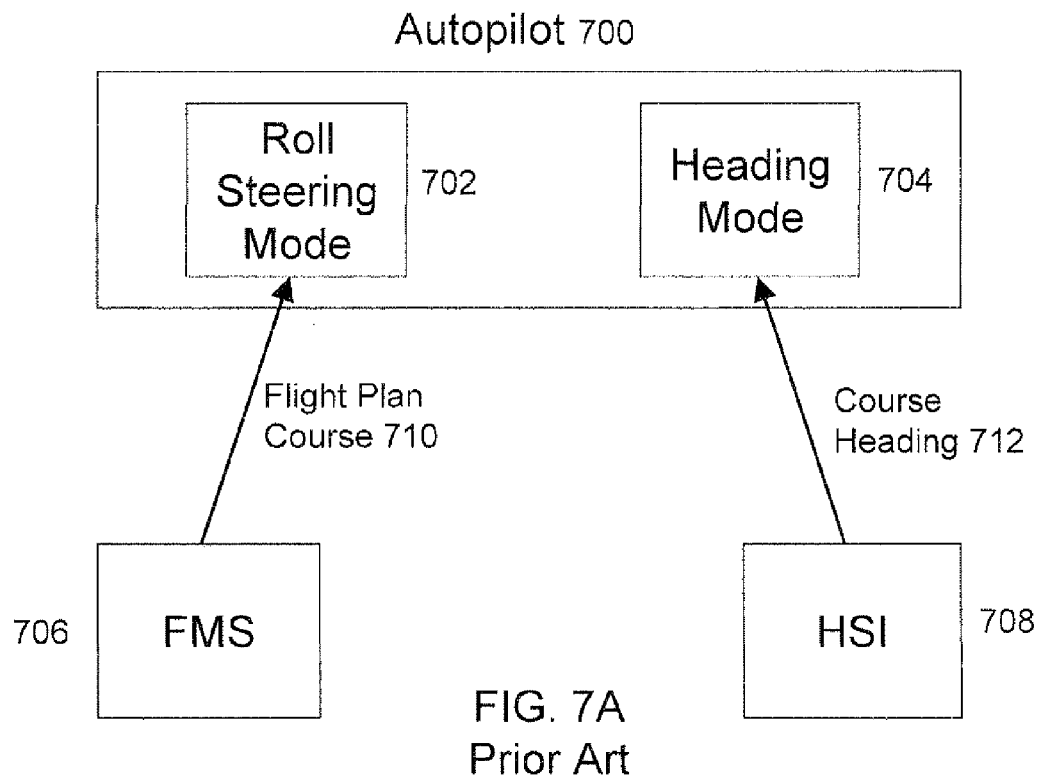
FIG. 7A is a schematic illustration of communications between an autopilot, a flight management system, and a horizontal situation indicator according to the prior art.
Figure 7B:
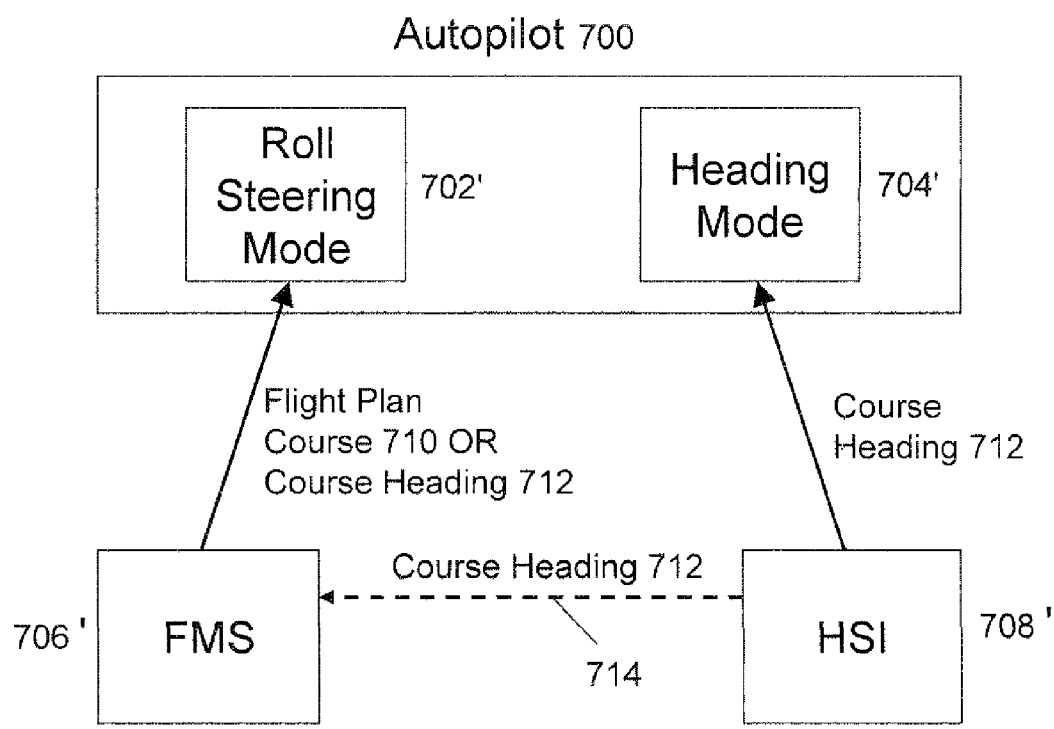
FIG. 7B is a schematic illustration of one possible embodiment of an autopilot, a flight management system, and a horizontal situation indicator according to the present invention.

FIGS. 7A and 7B provide schematic figures that illustrate the different flow of information between the various avionics under the prior art and under an embodiment of the present invention respectively. Importantly, the actual components between prior art systems and systems under the present invention do not substantially change; each has an autopilot 700, 700' with at least a roll steering mode 702, 702' and a heading mode 704, 704', a Flight Management System 706, 706', and a Horizontal Situation Indicator 708, 708'. In the prior art, the autopilot 700 must be switched between roll steering mode 702 and heading mode 704 by the pilot in order to steer the aircraft by a course heading 712. In roll steering mode 702, the autopilot 700 steers the aircraft according to the preprogrammed flight plan 710 stored in the FMS 706. In heading mode 704, the autopilot 700 steers the aircraft according to the course heading 712 from the HSI 708'. As discussed above, the need to switch the autopilot 700 from roll steering mode 702 to heading mode 704 in the prior art adds to the pilot's workload.

An embodiment of the present invention, schematically shown in FIG. 7B, allows for either the flight plan course 710 or the course heading 712 to be transmitted to the autopilot 700' via the FMS 706'. Thus, the airplane may be controlled by the flight plan in the FMS 706' or by a course heading 712 provided by the pilot. In the present invention, the course heading 712 provided by the pilot may be input directly into the FMS 706' or transmitted 714 from the HSI 708'. Furthermore, the HSI 708' may be a stand-alone instrument or may be incorporated into a multi-function device, such as a Primary Flight Display (PFD). By enabling the FMS 706' to send either the flight plan course 710 or the course heading 712 to the autopilot 700' in roll steering mode 702', the pilot is saved a procedural step when switching to vectors.

Figure 8:
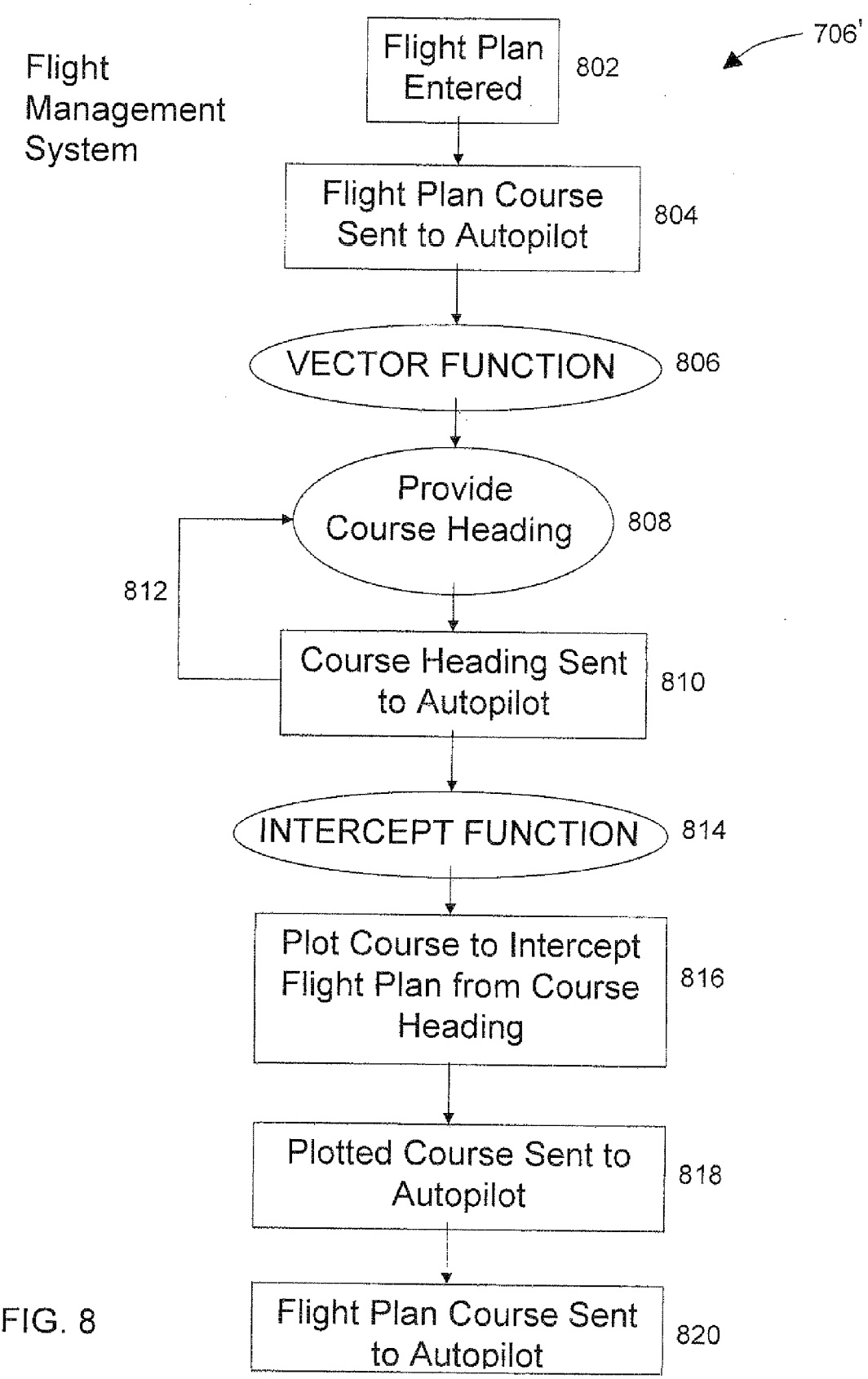
FIG. 8 is a schematic illustration of the processing steps within a flight management system embodying the present invention.

FIG. 8 depicts a schematic of an embodiment of the present invention, showing one method by which the FMS 706' may send heading information to the autopilot 700'. Prior to flight, the pilot will enter 802 a preprogrammed flight plan 710 into the FMS 706', the flight plan containing sequential "legs" of the trip. In flight, the FMS 706' sends information related to the active leg of the trip 804 to the autopilot 700'. As the aircraft moves from one leg to the next leg, the FMS 706' updates the information related to the active leg of the trip to the autopilot 700'. If the pilot must deviate from the flight plan 710, the pilot activates the VECTOR function 806 within the FMS 706' and provides 808 a course heading 712 to the FMS 706'. The course heading 712 may be input directly into the FMS 706' by the pilot or may be received by another avionics component in the aircraft, such as an HSI 708'. Once the VECTOR function 806 has been activated and course heading 712 entered at step 808, the FMS 706' in the midst of sending 804 the information related to the flight plan course 710 to the autopilot 700', starts sending 810 information related to the course heading 712. The course heading steps 808, 810 may be repeated several times as the pilot changes heading so long as the VECTORS function 806 remains active. When the pilot is ready to resume the preprogrammed flight plan 710, the INTERCEPT function 814 is activated. The FMS 706' then plots (step 816) a course from the course heading 712 to intercept the preprogrammed flight plan 710. This plotted course is then sent (step 818) to the autopilot 700'. After the aircraft has intercepted the flight plan 710, the FMS 706' resumes 820 sending the preprogrammed flight plan 710 course information to the autopilot 700'.

It is noted that in accordance with a key feature of the present invention, each of the foregoing steps for applying a course heading 712 are accomplished with the autopilot 700' in roll steering mode 702'. Thus the need for the pilot to switch the autopilot 700' between roll steering mode 702' and heading mode 704' as in the prior art is completely avoided by embodiments of the present invention.

Vectors to Final

For many instrument approaches the first leg is called "vectors to final" (VTF) because ATC sends heading commands to a pilot until the airplane is situated in close proximity to the final approach path. According to the prior art methods, a pilot pauses the flight plan and adjusts the heading bug during VTF operation. When flying with an autopilot, the autopilot is taken out of roll steering and put into heading mode during this operation. During this high workload period of flying, talking with ATC and navigating an approach, the pilot has more actions to perform than any other period on a flight.

Figure 9:
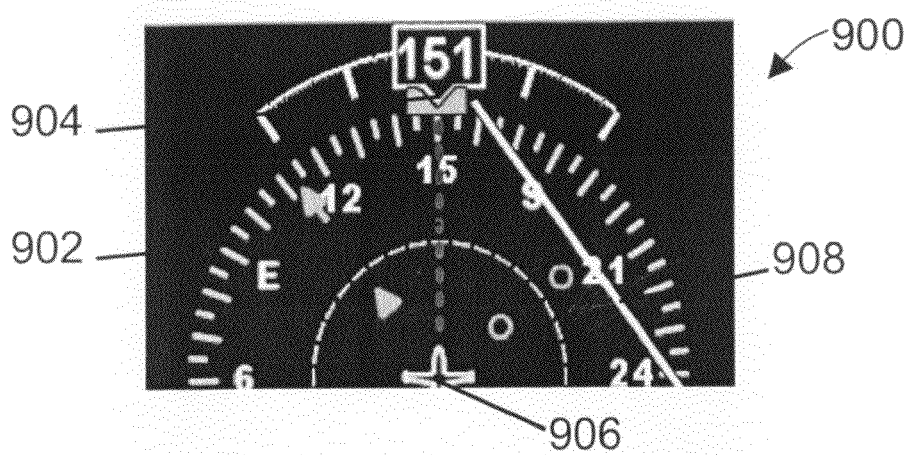
FIG. 9 illustrates one possible embodiment of a screen display of a primary flight display according to the present invention.

An embodiment of a primary flight display according to the present invention representing an aircraft operated in "vectors to final" mode is shown in FIG. 9. When in vectors mode and viewing the map display 900, a straight line 902 projects out from the nose of the aircraft reference symbol 906. The straight line 902 represents the projected track of the airplane based on the selected heading 904, but is adjustable for winds (i.e., crabbing). The straight line 902 in this example embodiment extends out for a distance of twenty five nautical miles (nm). The straight line 902 is shown as a dashed line because it does not cross any legs of the preprogrammed flight plan (e.g., 908) or because it does cross a leg of the preprogrammed flight plan but is not armed to intercept that leg. The straight line 902 may be solid if it does cross a leg of the preprogrammed flight plan and is armed to intercept the leg. When the FMS is armed to intercept, it transitions the FMS guidance from the current vectors leg onto the leg that the straight line has crossed. At the crossing point, the straight line curves to indicate the projected curve of the aircraft to intercept the new leg based on the aircraft's ground speed. A softkey on the FMS may be depressed to disarm intercepting the crossed leg of the preprogrammed flight plan.

As shown in FIG. 9, the present invention Vectors function significantly reduces workload without the need to suspend the flight plan or change the mode on the autopilot. This may be achieved by adding the Vectors user interface that allows the pilot to change the heading as commanded from ATC without needing to take the autopilot out of roll steering mode. The heading bug indication 904 on the primary flight display (PFD) 900 horizontal situation indicator (HSI) compass may indicate a different color to show that the heading command is a roll steering command versus a heading command, but to the pilot, they perform the same function. To indicate vectors mode, a "–V→" (Vectors) icon for example may optionally appear on the autopilot annunciator strip on the top of the PFD (along with GPSS). The "–V→" icon replaces the HDG annunciator because they cannot co-exist.

Figure 10:
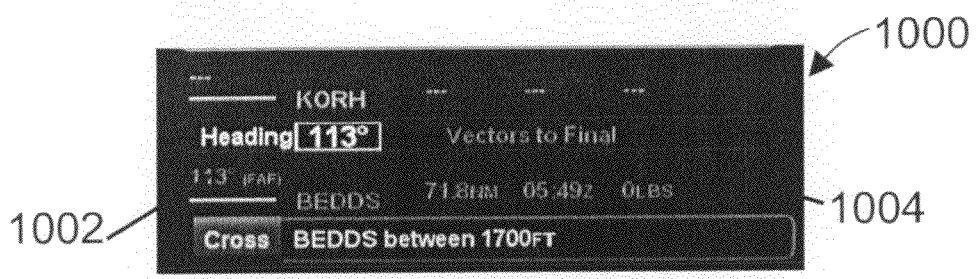
FIG. 10 illustrates one possible embodiment of a flight management system display during a vectors to final phase of flight according to the present invention.

As shown in example display 1000 of FIG. 10, during VTF, the Federal Aviation Association (FAA) regulations state that lateral deviations to the final approach fix (FAF) 1002 must be provided. For a pilot, this deviation helps him know how far away the airplane is from being on course. It is ATC's job to command headings to the pilot so that the airplane is on this course prior to the FAF. This may be indicated by the Vectors indication 1004 and the FAF leg. The added situational awareness in these conditions is a great benefit for the pilot.

Figure 11:
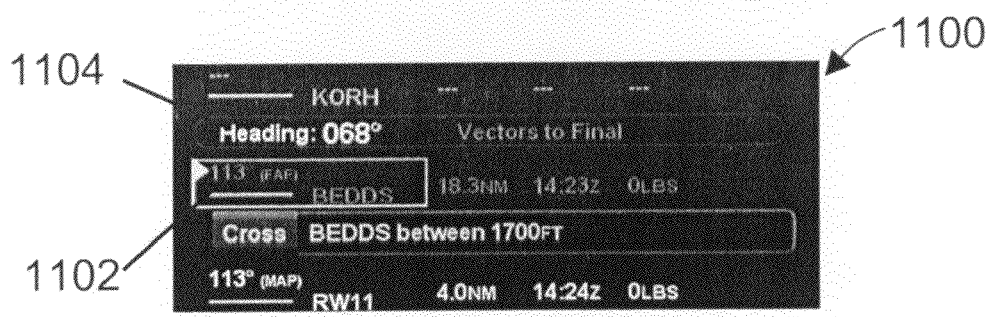
FIG. 11 illustrates one possible embodiment of a flight management system display during a vectors to final phase of flight according to the present invention.

As shown in example display 1100 of FIG. 11, when the airplane is close to the FAF, the ATC will say "intercept FAF, vectors terminated" and the pilot intercepts the course to the FAF or the final approach leg of the flight plan 1102. When the VTF 15 enabled, the default in the FMS is to automatically intercept the FAF leg within a capture zone as indicated by, "ARM INTC TO FINAL". If the ATC doesn't command the intercept to the FAF, then the pilot flies over the FAF leg and awaits further ATC instructions. The vectors indication is continuously given at 1104. The disable intercept is performed by a soft button, "DISARM INTERCEPT" for example. When flying vectors without an intercept armed there is a soft button, "ARM INTERCEPT" for the pilot to sequence back onto a flight plan leg.

When the final approach course to the FAF is intercepted and the pilot commands the intercept, the Vectors indication is sequenced but remains in the flight plan for the pilot to move the cursor back up to re-enable at any point.

Missed Approach

Instrument approaches are designed with a procedure, or backup plan, when a pilot is unable to make a landing at the runway. This procedure is called a missed approach. A missed approach procedure can be enabled at any point when the pilot is on final approach and typically is enabled to climb the aircraft to an altitude of four hundred feet above the runway followed by a path to a holding pattern. According to the prior art methods, the pilot suspends the flight plan during the approach until the missed approach procedure is enabled. Loading an approach involves putting the autopilot in a GS, or glideslope mode, where the autopilot flies the radio deviations from the onboard radio following the instrument landing system (ILS). Beyond the Missed Approach Waypoint (MAP) the autopilot is not legally flown, so it is disengaged by the autopilot. When the missed approach is enabled the pilot manually flies the controls until roll steering is re-engaged and the autopilot flies to a holding pattern defined from the published approach procedure. When the holding pattern is reached, the flight plan is suspended and the pilot manually flies the hold.

Figure 12:
FIG. 12 illustrates one possible embodiment of a flight management system display during a missed approach phase of flight according to the present invention.

As shown in example display 1200 of FIG. 12, the present invention "Vectors" approach to flying a missed approach is to keep the autopilot in roll steering mode and vertical speed mode for the duration of the approach (VNAV and LNAV— unchanged for duration of flight). Roll and pitch steering commands are used from the FAF to the MAP and the pilot disengages the autopilot, according to the autopilot limitations. The initial state of the vectors heading display is "- - -" 1202, indicating that the published approach will be flown, when the missed approach is enabled, if the pilot doesn't change the heading.

Figure 13:
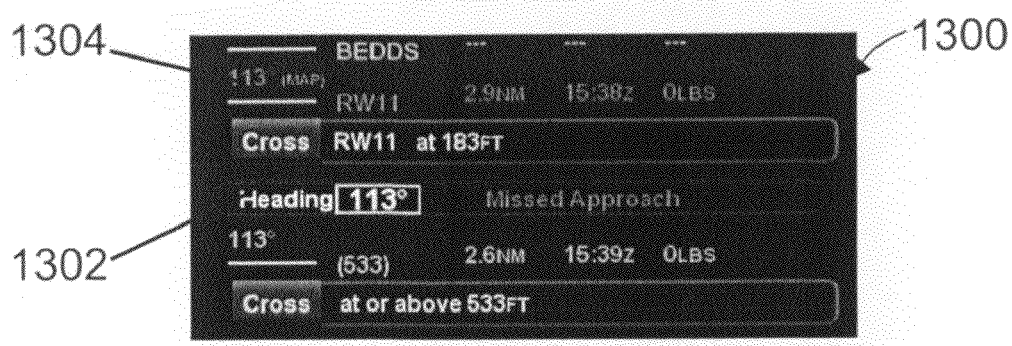
FIG. 13 illustrates one possible embodiment of a flight management system display during a missed approach phase of flight according to the present invention.

As shown in example display 1300 of FIG. 13, if the pilot changes the heading and the missed approach is enabled 1302, the heading can be commanded by the pilot. To transition onto the vectors leg, the pilot presses the VECT (or –V→) button on the keyboard; otherwise, the FMS flies through the MAP point and provides "from" guidance at the MAP 1304.

Figure 14:
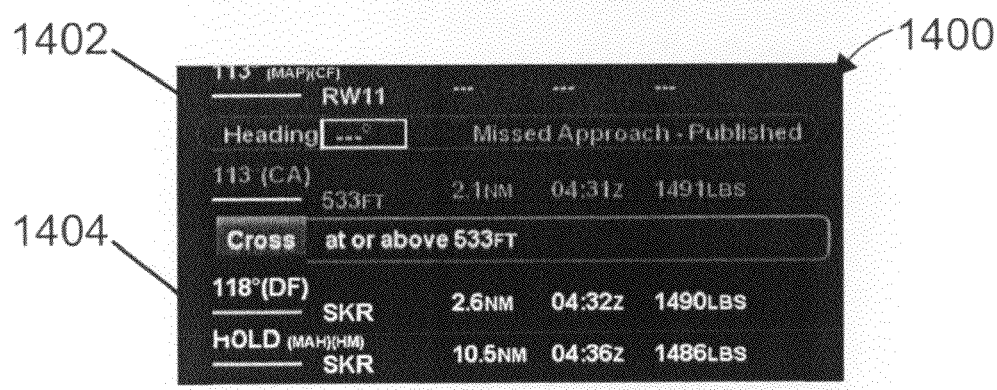
FIG. 14 illustrates one possible embodiment of a flight management system display during a missed approach phase of flight according to the present invention.

As shown in example display 1400 of FIG. 14, if, at any time, the missed approach is enabled with the vectors function, then the published missed approach procedure can be re-enabled by a single button press prior to the MAP 1402. The autopilot with FMS roll steering guidance flies the airplane along the missed approach procedure to the holding pattern 1404 and the FMS guides the airplane onto the holding pattern. During the holding pattern the flight plan stays engaged with guidance providing the roll steering commands to the autopilot. The amount of pilot interaction with the flight plan and the autopilot is significantly reduced, in essence making instrument flight rules (IFR) flying safer.

If the pilot has enabled the published missed approach, the "VECT" (or –V→) button on the keyboard is used to disable it and fly vectors. This allows the pilot to follow additional ATC instructions for vectors for repeating the approach. In this scenario, the cursor is moved back up to the VTF location and the pilot re-activates the VTF in order to repeat the approach.

Discontinuity

Figure 15:
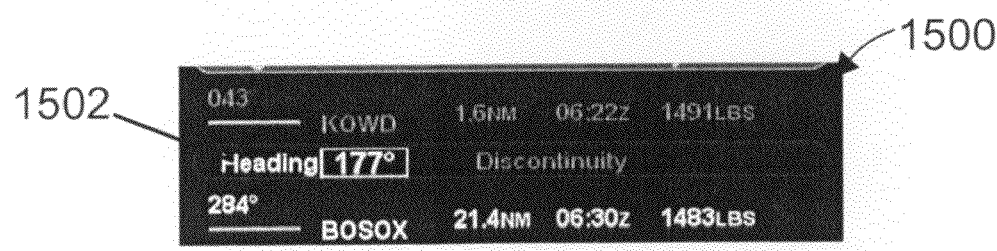
FIG. 15 illustrates one possible embodiment of a flight management system display during a discontinuity in the flight plan according to the present invention.

As shown in example display 1500 of FIG. 15, there are instances where the FMS has no knowledge of how to connect two points in a flight plan, these are call discontinuities or 'discons' 1502. The pilot can manually delete these discons or fly into this area.

When a discon is not deleted and the airplane flies beyond this point, the FMS maintains the course going into the last waypoint prior to the discon. The "Vectors" function allows the pilot to command the heading through the FMS while keeping the autopilot in roll steering mode.

Figure 16:
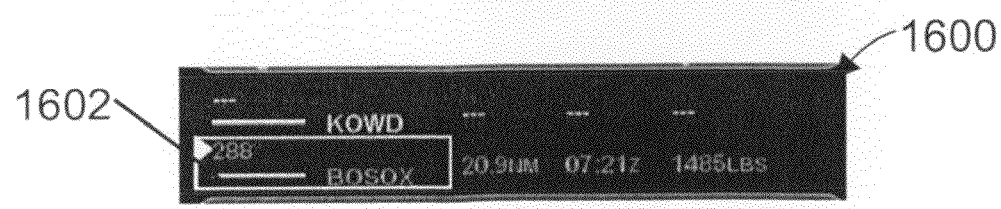
FIG. 16 illustrates one possible embodiment of a flight management system display during a missed approach phase of flight according to the present invention.

As shown in example display 1600 of FIG. 16, changes of heading are commanded until the discon is closed or the next leg is intercepted 1602. Like the VTF case, the default is set to "ARM INTERCEPT", which indicates that the leg following the discon is intercepted if the vectors heading is on a path to intercept it. Once a discon is closed it is removed from the flight plan.

Radar Vectors

During a flight, deviations off of the planned route may be required due to traffic or weather along the path. These are either commanded by ATC or initiated by the pilot. Commands from ATC typically are in the form of repeated heading directions that the pilot would change with his heading bug for the autopilot to follow. According to prior art methods, the flight plan would be suspended and the autopilot mode changed from roll steering mode to heading mode until the ATC commands are completed and the flight plan is resumed.

With the vectors functions of the present invention, the pilot would press the "VECT" (or –V→) button on the keyboard and the Vectors control is inserted prior to the active leg that allows the pilot to enter a heading while remaining in roll steering mode. The heading is adjusted through the FMS vectors control or by the standard way a heading bug is adjusted. This is done from the PFD or by a keyboard dedicated heading knob. Once the ATC commands were complete, the pilot changes the heading to re-intercept the flight plan and press "ARM INTERCEPT", which would fly the airplane back to a point on the preprogrammed flight plan and the airplane would capture the path from FMS guidance roll steering commands to the autopilot.

Autopilot Integration

The present invention VECTORS function significantly reduces the amount of interaction with an autopilot. The pilot actions listed below are for the prior art integration of the Avidyne EXP5000, GNS-430 and the S-TEC 55X compared with an example of the present invention using the Avidyne Entegra II FMS and the S-TEC 55X.

1) Vectors to Final and the 55X
    A) Prior Art Method using the EXP5000, 430 and 55X
       From Roll Steering Mode and flying an ILS approach:—while using GPS1 as primary guidance, 55X in NAV GPSS
    1) GNS-430: Load approach with a "VECTORS" approach transition.
    2) Select load or activate (knob);
    3) GNS-430: Activate "Vectors-To-Final";
    4) Hit FPL button to escape flightplan view;
    5) GNS-430: Tune the ILS frequency—tune and flip/flop;
    - - - flying VTF - - -
    6) 55X: Press "HDG" for heading mode—leaving leg inbound to destination airport;
    7) GNS-430: Press "OBS" to suspend the flight plan;
    8) EXP5000: Rotate heading knob as commanded by ATC to change autopilot heading hold
    - - - intercept final approach leg - - -
    9) EXP5000: Change Nav Source from "GPS" to "VLOC";
    10) 55X: Simultaneously press "HDG", "NAV", "APPR" to arm the approach—must be done at appropriate time. If done too early and aircraft is vectored abeam threshold, HDG drops and NAV APR activates attempting to intercept final approach course;
    11) EXP5000: flying heading until the ILS is intercepted;
    12) 55X: automatically transitions to "NAV APR" when the ILS localizer is captured and GS arms if below GS and within 50% LOC, automatically transitions to "GS" when the ILS glideslope is captured; and
    13) GNS-430: Press "OBS" to sequence onto the approach.
    Note: Missed is a direct to MAP. Interim legs (runway hdg to an altitude) and hold guidance not available. Probably need to use HDG/VS modes to accomplish published missed instructions prior to direct to MAP
    B) Method of an Embodiment of the Present Invention using the Entegra II (referred to as "E2" below) FMS and 55X
       From Roll Steering Mode and flying an ILS approach:
    1) E2 FMS: Load approach with a "VTF" transition;
    - - - flying VTF - - -
    2) E2 Keyboard: Rotate HDG knob as commanded by ATC to intercept the final;
    - - - intercept final approach leg - - -
    3) E2 PFD: Automatically changes Nav Source to "VLOC1" when on the final approach leg;
    4) 55X: Simultaneously press "NAV" and "APPR" to arm the approach—do this after established inbound; and
    5) 55X: automatically transitions to "NAV APR" when the ILS localizer is captured and glide slope (GS) arms if below GS and within 50% LOC, automatically transitions to "GS" when the ILS glideslope is captured.

2) Missed Approach and the 55X
   A) From ILS to Roll Steering on the Missed Approach in the present invention
      1) E2 FMS: Press "Activate Missed" (cursor to Vectors Hdg or fly the published);
      2) 55X: Press "NAV", "NAV" to go into roll steering mode; and
      3) E2 Keyboard: Rotate Heading knob.
3) Discontinuities and the 55X
   A) The FMS flies "From" guidance unless a heading is entered and the vectors button is pressed in embodiments of the present invention.
      1) E2 Keyboard: When in the Discon, rotate the heading;
      2) E2: automatically intercepts leg in the flight plan if crossed.
4) Radar Vectors and the 55X
   Tactical vectors when on the plan in embodiments of the present invention
   E2 Keyboard: Press "VECT" (or –V→) to get the Vectors command window
   E2 Keyboard: Rotate Heading knob to change heading until another leg is intercepted While this invention has been particularly shown and described with references to preferred embodiments thereof, it will be understood by those skilled in the art that various changes in form and details may be made therein without departing from the scope of the invention encompassed by the appended claims.

For example, the pressing of certain "buttons" is discussed above for purposes of illustration and not limitation. Embodiments of the invention may employ other means of user-pilot selection and command.

Further it is understood that the above described elements and features of the present invention may be implemented in hardware, software, firmware or any combination thereof. A variety of system architectures and configurations may be employed, the above disclosed embodiments, examples and figures being non limiting illustrations of the principals of the present invention.

What is claimed is:

1. A method of guiding an aircraft via autopilot in roll steering mode comprising the computer implemented steps of:
   operating an autopilot in roll steering mode, the autopilot receiving roll steering commands from a flight management system that is following a preprogrammed flight plan that is comprised of sequential legs, the flight management system providing roll steering commands related to an active leg of the preprogrammed flight plan;
   determining a heading unrelated to the preprogrammed flight plan;
   providing the determined heading to the flight management system; and
   instructing the flight management system (i) to treat the determined heading as the active leg of the preprogrammed flight plan about which the flight management system roll steering commands being sent to the autopilot are related and (ii) to automatically resume the preprogrammed flight plan when the aircraft intercepts a leg of the preprogrammed flight plan;
   wherein throughout said steps of determining, providing and instructing, the autopilot is in roll steering mode, avoiding the need to switch the autopilot between roll steering mode and a course heading mode.

2. The method of claim 1 wherein instructing the flight management system to automatically resume the preprogrammed flight plan includes providing instructions to the flight management system to either:
   resume the preprogrammed flight plan when the aircraft intercepts a leg of the preprogrammed flight plan; or
   continue following the determined heading when the aircraft intercepts a leg of the preprogrammed flight plan.

3. The method of claim 1 further comprising defining an interception point of the leg of the preprogrammed flight plan from the determined heading.

4. The method of claim 1, wherein the active leg is unrelated to landing or takeoff.

5. A method for providing heading inputs unrelated to a preprogrammed flight plan to an aircraft autopilot in roll steering mode comprising:
   operating the aircraft autopilot in roll steering mode;
   determining a course heading unrelated to a preprogrammed flight plan that is comprised of sequential legs;
   communicating the determined course heading to a flight management system that is transmitting roll steering commands related to an active leg following the preprogrammed flight plan to the aircraft autopilot operating in roll steering mode; and
   instructing the flight management system (i) to transmit roll steering commands related to the determined course heading instead of the steering commands related to the active leg of the preprogrammed flight plan to the autopilot and (ii) to automatically resume the preprogrammed flight plan when the aircraft intercepts a leg of the preprogrammed flight plan, the autopilot remaining in roll steering mode throughout said operating, determining, communicating and instructing such that any need to switch the autopilot between roll steering mode and course heading mode is avoided.

6. The method of claim 5 wherein instructing the flight management system to transmit steering commands to the autopilot roll related to the determined course heading instead of the steering commands related to the active leg of the preprogrammed flight plan comprises pressing a single button on the flight management system.

7. The method of claim 5 wherein communicating the determined course heading to a flight management system includes at least one of:
   turning a dial located on the Flight Management System (FMS);
   turning a dial located on a Flight Management Computer (FMC);
   turning a dial on a Horizontal Situation Indicator (HSI); and
   entering a course heading on a keypad.

8. A computer apparatus for providing heading commands to an autopilot of an aircraft, the autopilot having a roll steering mode and a heading mode, the apparatus comprising:
   means for providing a heading vector; and
   flight management means for (i) enabling the autopilot in roll steering mode to follow a preprogrammed flight plan comprised of sequential legs followed by the flight management means, the autopilot receiving roll steering commands from the flight management means, and (ii) for generating a heading command in response to the provided heading vector, (iii) while the autopilot is in roll steering mode, forwarding the generated heading command to the autopilot to follow the generated heading command while in roll steering mode, (iv) effectively treating the heading of the generated heading command as an active leg of the preprogrammed flight plan about which the roll steering commands being sent to the autopilot from the flight management means are related, and (v) automatically resuming the preprogrammed flight plan when the aircraft intercepts a leg of the preprogrammed flight plan, such that any need for the flight management means to switch the autopilot between roll steering mode and course heading mode is avoided.

9. The apparatus of claim 8 wherein the flight management means further subsequently determines an interception point of the leg of the preprogrammed flight plan from the heading of the heading command.

10. The apparatus of claim 8 wherein the autopilot is responsive to the heading command in roll steering mode and is responsive to the heading vector in heading mode.

11. The apparatus of claim 8 wherein the autopilot is maintained in roll steering mode.

* * * * *